(12) United States Patent
Bollman, IV

(10) Patent No.: US 9,576,309 B2
(45) Date of Patent: Feb. 21, 2017

(54) DYNAMIC POWER SHARING SYSTEM AND MAP VIEW GRAPHICAL USER INTERFACE

(71) Applicant: Snergy Inc., Peru, MA (US)

(72) Inventor: Mark Bollman, IV, Peru, MA (US)

(73) Assignee: Snergy Inc., Peru, MA (US)

( * ) Notice: Subject to any disclaimer, the term of this patent is extended or adjusted under 35 U.S.C. 154(b) by 0 days.

(21) Appl. No.: 14/539,113

(22) Filed: Nov. 12, 2014

(65) Prior Publication Data
US 2016/0132947 A1    May 12, 2016

(51) Int. Cl.
G06Q 30/00 (2012.01)
G06Q 30/06 (2012.01)
H01M 10/44 (2006.01)

(52) U.S. Cl.
CPC ...... *G06Q 30/0611* (2013.01); *H01M 10/446* (2013.01)

(58) Field of Classification Search
CPC .............. G06Q 30/00; G06Q 30/0601; G06Q 30/0611; G06Q 30/0613; G06Q 30/0619
See application file for complete search history.

(56) References Cited

U.S. PATENT DOCUMENTS

| | | | | |
|---|---|---|---|---|
| 7,246,075 B1 * | 7/2007 | Testa | .......................... | 705/7.22 |
| 8,819,490 B2 * | 8/2014 | Li | ....................... | G06F 11/3688 |
| | | | | 714/32 |
| 8,826,068 B2 * | 9/2014 | Somendra | ........... | G06F 11/3688 |
| | | | | 714/15 |
| 8,898,492 B2 | 11/2014 | Sha et al. | | |
| 2009/0300423 A1 * | 12/2009 | Ferris | ....................... | G06F 11/36 |
| | | | | 714/38.1 |
| 2010/0198960 A1 * | 8/2010 | Kirschnick | ......... | G06F 11/3414 |
| | | | | 709/224 |
| 2012/0098485 A1 | 4/2012 | Kang et al. | | |
| 2012/0123674 A1 * | 5/2012 | Perks | .................... | G09B 29/007 |
| | | | | 701/426 |
| 2012/0158539 A1 * | 6/2012 | Lawrence et al. | ........... | 705/26.8 |
| 2012/0266001 A1 * | 10/2012 | Sha | ....................... | H02J 7/0004 |
| | | | | 713/300 |
| 2013/0124278 A1 * | 5/2013 | Najm | ......................... | 705/14.11 |
| 2014/0129316 A1 * | 5/2014 | Napoletano | ........ | G06Q 30/0207 |
| | | | | 705/14.36 |
| 2014/0188318 A1 * | 7/2014 | Langgood et al. | ............. | 701/22 |

(Continued)

OTHER PUBLICATIONS

Gaonkar, et al. "Micro-blog: sharing and querying content through mobile phones and social participation." Proceedings of the 6th international conference on Mobile systems, applications, and services. ACM, 2008.*

(Continued)

*Primary Examiner* — Jeffrey A Smith
*Assistant Examiner* — Christopher Seibert
(74) *Attorney, Agent, or Firm* — Fish & Richardson P.C.

(57) ABSTRACT

A method comprising receiving, on a server, from a computing device of a user, a request to receive a battery charge on a battery-powered device of the user, the request including one or more criteria; identifying, by the server, one or more potential charge donors as target charge donors by comparing the criteria of the request with donor preferences previously provided by potential charge donors; and sending, from the server, information related to a target charge donor to the computing device of the user.

26 Claims, 11 Drawing Sheets

(56) References Cited

U.S. PATENT DOCUMENTS

2014/0194092 A1* 7/2014 Wanstedt et al. ............. 455/406
2014/0336925 A1* 11/2014 Akin ...................... G01C 21/00
　　　　　　　　　　　　　　　　　　　　　　　　701/457

OTHER PUBLICATIONS

International Search Report and Written Opinion, PCT/US15/59664, mailed Jan. 11, 2016, 11 pages.

* cited by examiner

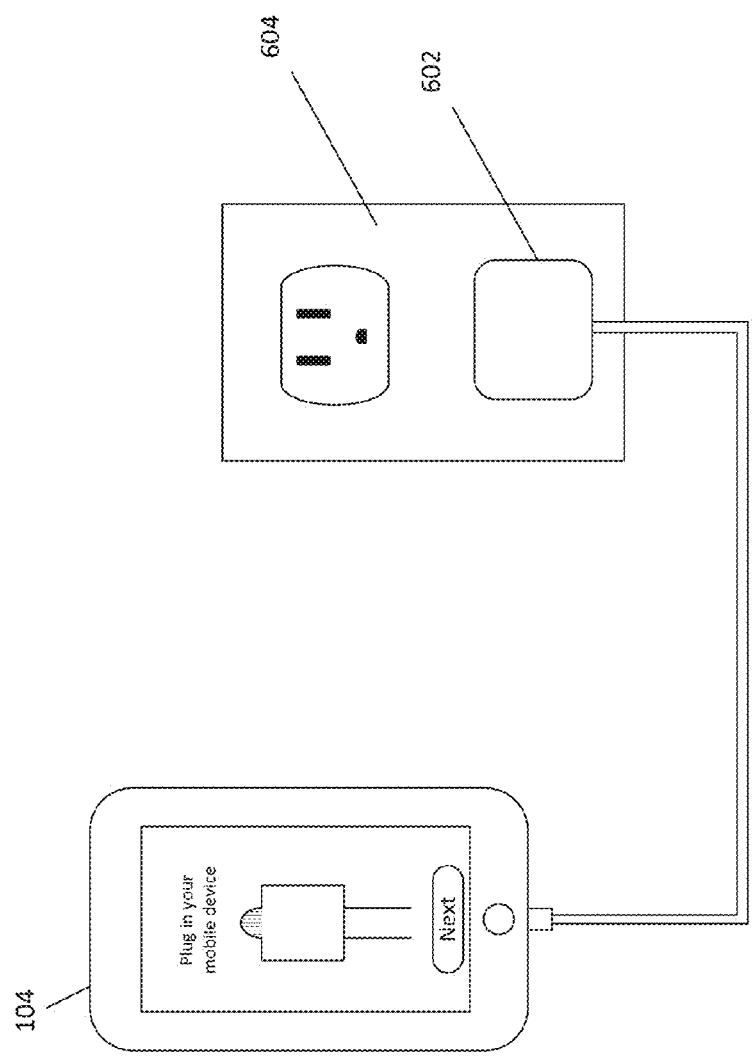

DYNAMIC POWER SHARING SYSTEM AND MAP VIEW GRAPHICAL USER INTERFACE

TECHNICAL FIELD

This disclosure relates to power sharing.

BACKGROUND

Battery-powered devices have limited power capacity. At times, owners of battery-powered devices that are low on power do not have a way to charge their battery-powered devices.

SUMMARY

In one aspect, a method includes receiving, on a server, from a computing device of a user, a request to receive a battery charge on a battery-powered device of the user. The request includes one or more criteria. The method also includes identifying, by the server, one or more potential charge donors as target charge donors by comparing the criteria of the request with donor preferences previously provided by potential charge donors. The method also includes sending, from the server, information related to a target charge donor to the computing device of the user.

Implementations can include one or more of the following features.

In some implementations, the computing device is the battery-powered device.

In some implementations, the one or more criteria include an amount of charge and a time for charge.

In some implementations, the donor preferences include a charging method and a reward.

In some implementations, the one or more criteria include a reward.

In some implementations, the reward is to be received by one or both of the target charge donor and a third party.

In some implementations, the computing device is a wireless mobile device, and the third party is a wireless service provider associated with the wireless mobile device.

In some implementations, the third party is a business establishment where the user is to receive the battery charge on the battery-powered device.

In some implementations, the donor preferences include a geographic proximity of the battery-powered device.

In some implementations, the method also includes receiving, on the server, an indication of the amount of charge on the battery of the device.

In some implementations, the method also includes determining, by the server, a length of charging time required for the battery-powered device to receive the requested battery charge based on the requested amount of charge, the charging method, and the amount of charge on the battery of the device.

In some implementations, the method also includes sending, from the server, information related to the user of the battery-powered device to a computing device of the target charge donor.

In some implementations, the computing device is a wireless mobile device.

In some implementations, the information related to the target charge donor includes a location of the target charge donor.

In some implementations, the location of the target charge donor is represented as an icon on a map displayed on the battery-powered device.

In some implementations, the information related to the target charge donor includes one or both of the donor preferences of the target charge donor and a link to a social media page of the target charge donor.

In some implementations, the information related to the user includes a location of the user.

In some implementations, the location of the user is represented as an icon on a map displayed on the device of the target charge donor.

In some implementations, the information related to the user includes one or both of the criteria of the request and a link to one or more social media pages of the user.

In some implementations, the battery-powered device is a wireless mobile device.

In some implementations, the battery-powered device is an electric vehicle.

In some implementations, the method also includes receiving, on the server, from the computing device of the user, one or more of information related to an amount of charge on a battery of the electric vehicle, information related to a geographic location of the electric vehicle, and information related to a destination of the electric vehicle.

In some implementations, identifying one or more potential charge donors as target charge donors includes determining, by the server, whether the electric vehicle is capable of making it to the destination using the amount of charge on the battery.

In another aspect, a system includes a server that includes a memory configured to store instructions. The server also includes a processor to execute the instructions to perform operations including receiving, on the server, from a computing device of a user, a request to receive a battery charge on a battery-powered device of the user. The request includes one or more criteria. The operations also include identifying, by the server, one or more potential charge donors as target charge donors by comparing the criteria of the request with donor preferences previously provided by potential charge donors. The operations also include sending, from the server, information related to a target charge donor to the computing device of the user.

In another aspect, a computer program product tangibly embodied in an information carrier includes instructions that when executed by a processor perform a method including receiving, on a server, from a computing device of a user, a request to receive a battery charge on a battery-powered device of the user. The request includes one or more criteria. The method also includes identifying, by the server, one or more potential charge donors as target charge donors by comparing the criteria of the request with donor preferences previously provided by potential charge donors. The method also includes sending, from the server, information related to a target charge donor to the computing device of the user.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 6a shows the mobile device of the recipient plugged into a charger that is plugged into a wall outlet.

DETAILED DESCRIPTION

We live in a world where the general public is becoming increasingly dependent on mobile devices (e.g., smartphones, PDAs, tablets, etc.). People rely on mobile devices for various tasks, such as communication, navigation, and social networking, to name a few. A person may go out to dinner and have plans to meet up with friends after dinner. Following dinner, the person may call her friends on her mobile device to determine where her friends are. The person may then use her mobile device to navigate to the particular location. Throughout the night, the person may use her mobile device to text other friends, post pictures to social media sites, and look up information on the Internet. All of these functions consume battery power of the mobile device.

By 11:00 PM, the mobile device may only have 20% of battery power remaining. At this point, the person may start to stress because she needs enough battery power to call a friend for a ride at the end of the night, or enough battery power to navigate home. Alternatively, she may start to stress simply because she wants to be able to use her mobile device without limitation for the remainder of the night. Bars and restaurants may not be equipped with mobile device charging devices, so the person must look elsewhere for a charge. This type of problem is common in many social scenes.

Figure 1:
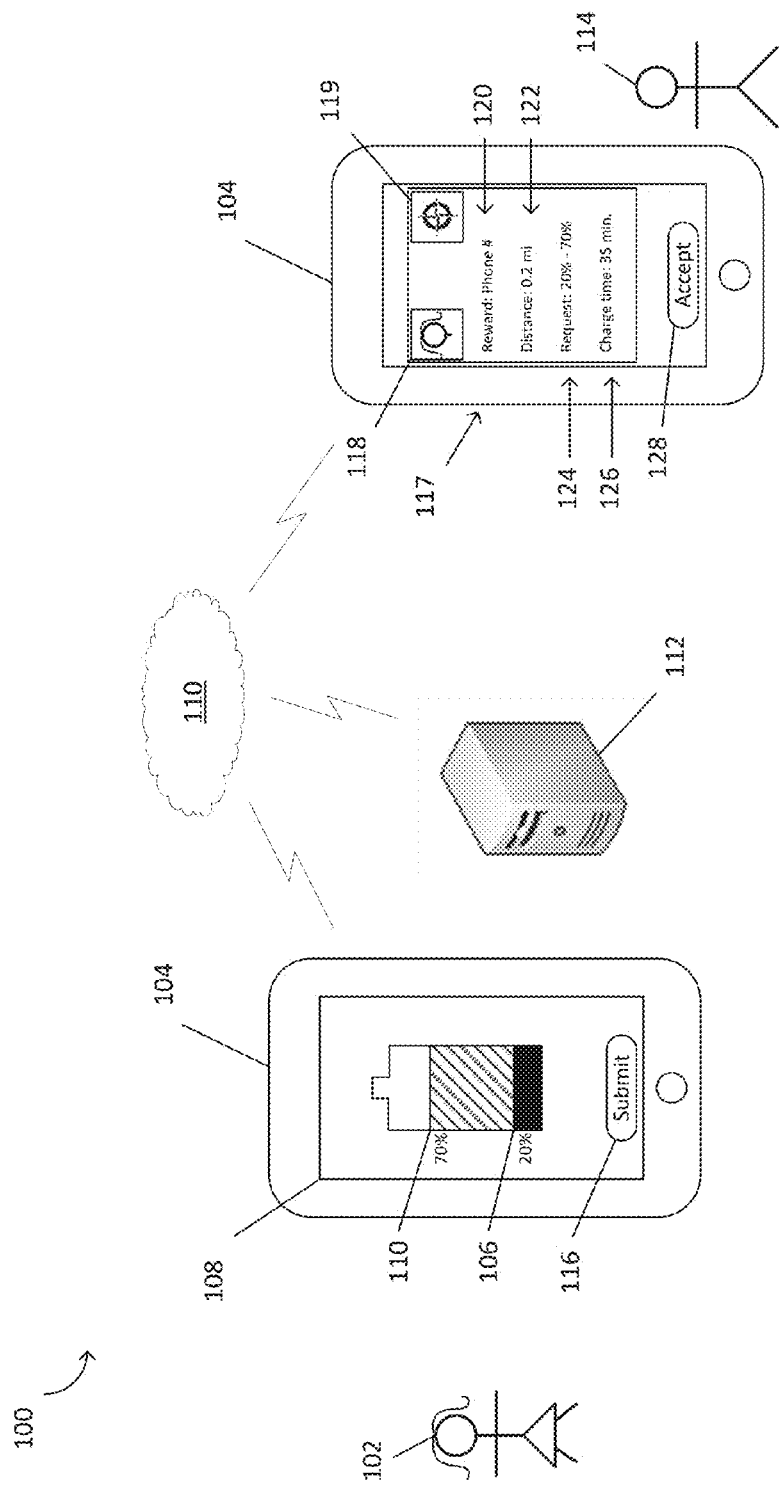
FIG. 1 is a system for connecting users who are in need of charge on their battery-powered devices with users who have power that they are willing to offer.

FIG. 1 shows a system 100 for connecting users who are in need of charge on their battery-powered devices with users who have charging capabilities in any form and whom are willing to offer that battery. The battery power may be offered in exchange for a reward. A battery-powered computing device such as a mobile device 104 belonging to a recipient 102 has only 20% of its battery power remaining, as indicated by the remaining battery power indicator 106 on a display 108 of the mobile device 104. The recipient 102 wants to charge her mobile device 104 up to 70% battery power. The recipient 102 indicates her desired battery power by sliding a desired battery power indicator 110 up or down on the display 108 until the display 108 shows the desired battery power (e.g., 70%). The recipient 102 also specifies a reward that will be given to the person who fulfills the recipient's 102 battery charge request, as explained in more detail below. In this example, the recipient 102 offers to give her phone number to the person who fulfills her request. The recipient 102 then submits her request by selecting a "submit" button 116 on the display 108.

The submitted request is transmitted to a server 112 via a network 110. The server 112 receives and processes the request. The server 112 then sends information related to the request to one or more targeted donors (e.g., a target charge donor 114) via the network 110. The target charge donors are identified from a pool of potential charge donors according to donor preferences that are predefined by the potential charge donors, as described in more detail below. The potential charge donors are people who have indicated that they have a way to provide battery power to a mobile device 104 of a recipient 102 and whom are willing to offer that battery charge for a specified amount of time in exchange for a reward.

The target charge donor 114 receives a notification 117 on his mobile device 104 from the server 120 via the network. The notification 117 can include a picture of the recipient 118, a map icon 119, a reward description 120, and a distance indicator 122 that indicates the geographic proximity of the recipient 102 in relation to the target charge donor 114. The notification 117 can also include the requested amount of battery power 124 and/or the charge time to attain the requested amount of battery power 126. In some examples, the target charge donor 114 may accept the request by selecting the "accept" button 128. In some examples, the request is "auto-accepted." The target charge donor 114 and the recipient 102 are then presented with a series of screens on their mobile devices 104 to facilitate their meet up for the agreed upon exchange. The target charge donor 114 provides battery power to the recipient 102 so that the recipient 102 attains 70% battery power on her mobile device 104, and the recipient 102 gives her telephone number to the target charge donor 114. Additional features of the system are described in more detail below.

Figure 2:
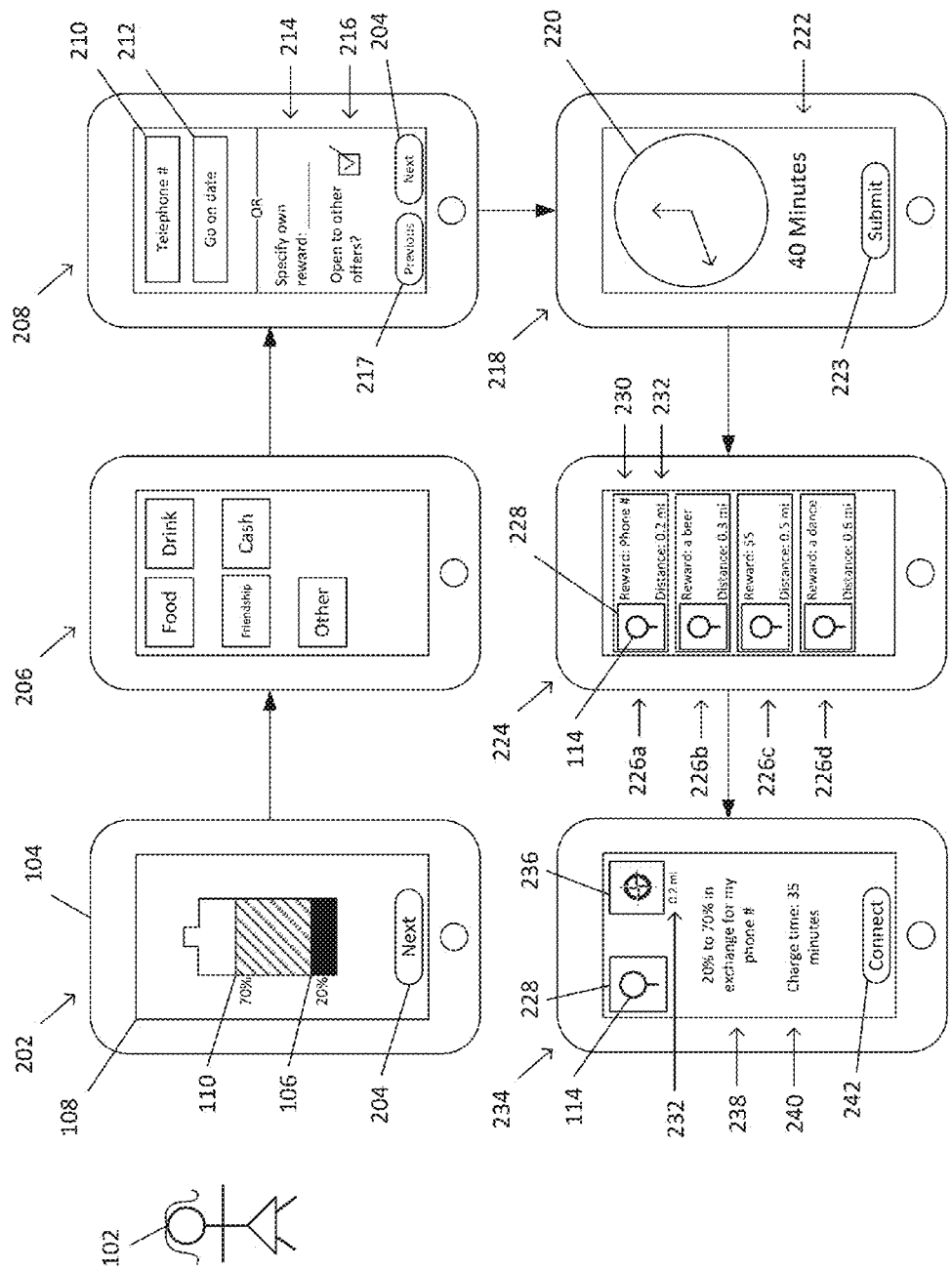
FIG. 2 shows a series of screens displayed on a mobile device of a recipient as the recipient is connected to a target charge donor.

FIG. 2 shows a series of screens displayed on the mobile device 104 of the recipient 102 as the recipient 102 is connected to the target charge donor 114. The recipient defines criteria of a battery charge request using the series of screens. As described above with reference to FIG. 1, on a power designation screen 202, the recipient 102 indicates her desired battery power by sliding a desired battery power indicator 110 up or down on the display 108 until the display 108 shows the desired battery power (e.g., 70%). The area between the remaining battery power indicator 106 and the desired battery power indicator 110 may change colors depending on the amount of desired battery power. For example, if the desired battery power is 70% or more, the area between the remaining battery power indicator 106 and the desired battery power indicator 110 may be green. If the desired battery power is between 20% and 70%, the area between the remaining battery power indicator 106 and the desired battery power indicator 110 may be yellow. Once the desired battery power is set to the recipient's 102 satisfaction, she proceeds to the next screen by selecting the "next" button 204 on the display 108 of the mobile device 104. In some implementations, one or more other portions of the display 108 (e.g., such as a background of the display 108) can change color based on the current charge level of the mobile device 104. For example, the background of the display 108 may be green when the current charge level of the mobile device 104 is 80% or more; the background of the display 108 may be yellow when the current charge level of the mobile device 104 is between 60% and 80%; the background of the display 108 may be orange when the current charge level of the mobile device 104 is between 40% and 60%; the background of the display 108 may be red when the current charge level of the mobile device 104 is 40% or less.

The recipient 102 is then presented with a reward preferences screen 206. The reward preferences screen 204 includes one or more preset reward categories that the recipient can choose from. The categories can include food, drink, friendship, cash, and "other". The reward preferences screen 206 allows the recipient 102 to select categories of rewards that she is willing to offer in exchange for her requested battery charge. For example, the recipient 102 may be willing to buy a potential charge donor a cheeseburger in exchange for a battery charge from 20% to 70%, in which case the recipient would select the "food" category. If the recipient 102 is willing to buy a potential charge donor a drink in exchange for her requested battery charge, she would select the "drink" category. If the recipient 102 is willing to give her telephone number to a potential charge donor or go on a date with a potential charge donor in exchange for her requested battery charge, she would select the "friendship" category. If the recipient 102 is willing to pay a potential charge donor a fixed sum of money in exchange for her requested battery charge, she would select the "cash" category. If the recipient 102 is willing to buy something for a potential charge donor that does not fall within one of the preset categories in exchange for her requested battery charge, she would select the "other" category. In this example, the recipient 102 is willing to give her telephone number to a potential charge donor in exchange for her requested battery charge, so the recipient 102 selects the "friendship" category.

The recipient 102 is then presented with a reward specification screen 208. The reward specification screen 208 includes one or more preset rewards that fall under the selected reward category. The reward specification screen 208 for the "friendship" category can include a "telephone #" preset reward 210 and a "go on date" preset reward 212. The reward specification screen 208 can also include a manual reward field 214 where the recipient 102 can manually specify her own reward. The reward specification screen 208 can also include a checkbox 216 that the recipient 102 can select to indicate that she is open to other offers from potential charge donors. The checkbox 216 can be checked if the recipient 102 wants to be presented with the maximum number of potential charge donors, regardless of the reward sought by the potential charge donors. In this example, the recipient 102 checked the checkbox 216, indicating that she wants to be presented with potential charge donors without taking into account the reward sought by the potential charge donors. The recipient 102 also explicitly selected the "telephone #" preset reward 210. The recipient 102 can select a "previous" button 217 to return to the reward preferences screen 206 and select additional rewards from other reward categories. Each reward category has its own subsequent reward specification screen. Once the recipient 102 has completed her reward selections, she proceeds to the next screen by selecting the "next" button 204.

The recipient 102 is then presented with a time specification screen 218. The recipient 102 can specify the amount of time that she is willing to wait while receiving the requested battery charge. The time specification screen 218 includes a visual representation of a stopwatch 220 and a corresponding time value 222. The recipient 102 specifies the amount of time that she is willing to wait by rotating the hands of the stopwatch 220. As the hands are rotated, the time value 222 is adjusted accordingly. In this example, the recipient 102 has indicated that she is willing to wait for 40 minutes while her battery is charged from 20% to 70%. Once the amount of time that the recipient 102 is willing to wait is specified, the recipient 102 submits her request by selecting a "submit" button 223. Referring again to FIG. 1, the submitted request is transmitted to the server 112 via the network 110, and the server 112 processes the request.

The server 112 includes a matching engine that is configured to identify one or more target charge donors (e.g., the target charge donor 114 of FIG. 1) that meet the criteria included in the request submitted by the recipient 102. The target charge donors are identified from a pool of potential charge donors according to donor preferences that are predefined by the potential charge donors. The matching engine compares the criteria included in the request submitted by the recipient 102 with the donor preferences of the potential charge donors, as described in more detail below. In this example, a potential charge donor who has indicated that he has a way to provide the requested amount of battery power to the mobile device 104 of the recipient 102 in less than 40 minutes can be identified as a target charge donor by the matching engine. The matching engine can take other factors into account when identifying target charge donors, such as the target charge donor's geographic proximity to the recipient 102.

Once the matching engine has identified one or more target charge donors, the recipient 102 is presented with a target charge donors screen 224. The target charge donors screen 224 includes a list of entries 226a-d. Each entry 226a-d corresponds to one of the target charge donors identified by the matching engine. Each entry 226a-d can include a picture of the target charge donor 228, a requested reward 230 of the target charge donor, and a distance indicator 232 that indicates the geographic proximity of the target charge donor in relation to the recipient 102. Each entry 226a-d may include more than one requested reward 230 that the recipient 102 can later choose from. In some examples, the recipient 102 can select the picture of one of the target charge donors 228 to view additional pictures of the target charge donor or to view a social media profile of the target charge donor. In this example, because the recipient 102 checked the checkbox 216 to indicate that she is open to other offers from potential charge donors, the recipient 102 is presented with entries 226a-d regardless of the reward sought by the corresponding target charge donors. The recipient 102 can select one of the entries 226a-d to proceed to the next screen. In this example, the recipient 102 selects the first entry 226a, which corresponds to the target charge donor 114 of FIG. 1.

Figure 3:
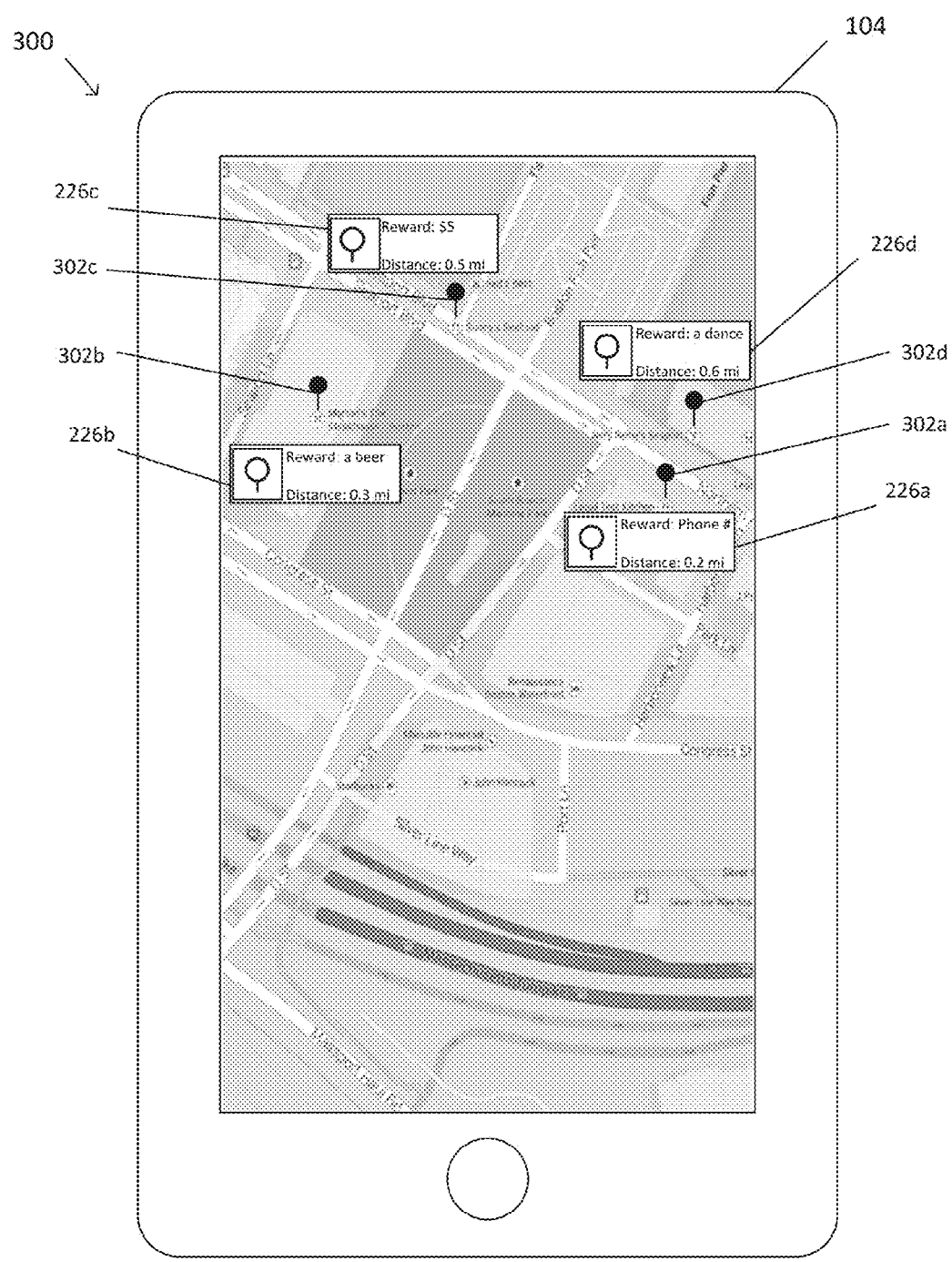
FIG. 3 is an example of a target donor screen that is displayed in map-view.

Referring briefly to FIG. 3, in some examples, a target charge donors screen 300 is displayed in map-view (e.g., using map software on the mobile device 104). Instead of the entries 226a-d being displayed in a list, each entry 226a-d is displayed on a map with an accompanying icon 302a-d. The recipient 102 can select one of the entries 226a-d or one of the icons 302a-d to proceed to the next screen.

Referring again to FIG. 2, once the recipient 102 selects the first entry 226a, she is presented with a connection screen 234. The connection screen 234 corresponds to the target charge donor 114 of the first entry 226a. The connection screen 234 can include the picture of the target charge donor 228, a map icon 236, the distance indicator 232, a summary of the potential exchange 238, a charge time indicator 240, and a "connect" button 242. The recipient 102 can select the map icon 236 to switch to a map-view, as described above with reference to FIG. 3. In map-view, the target charge donor's 114 position is shown on a map. In this example, the summary of the potential exchange 238 states that the target charge donor 114 will provide battery power to charge the mobile device 104 of the recipient 102 from 20% to about 70% in exchange for the recipient's 104 phone number. The charge time indicator 240 indicates an approximate length of time required to charge the mobile device 104 of the recipient 102 from 20% to 70%. In this example, the charge time indicator 240 indicates that it will take approximately 35 minutes to charge the mobile device 104 of the recipient 102 from 20% to 70%. The approximate length of time indicated by the charge time indicator 204 is calculated according to a charging algorithm, as explained in more detail below. To commit to the exchange, the recipient 102 selects the "connect" button 242.

Once the recipient 102 selects the "connect" button 242, the recipient has a predetermined amount of time to meet up with the target charge donor 114. The predetermined amount of time may be five minutes. In some examples, once the recipient 102 selects the "connect" button 242, the recipient 102 is presented with a screen that includes a countdown timer that counts down from the predetermined amount of time to zero. If the recipient 102 does not meet up with the target charge donor 114 within the predetermined amount of time, the recipient 102 may be charged a cancellation fee.

While the battery charge request is defined and submitted using the battery-powered device (e.g., the mobile device 104) in this example, the battery charge request can be defined and submitted using any of a number of computing devices. That is, the battery charge request can be submitted by a computing device other than the battery-powered device that is to receive a battery charge.

Figure 4:
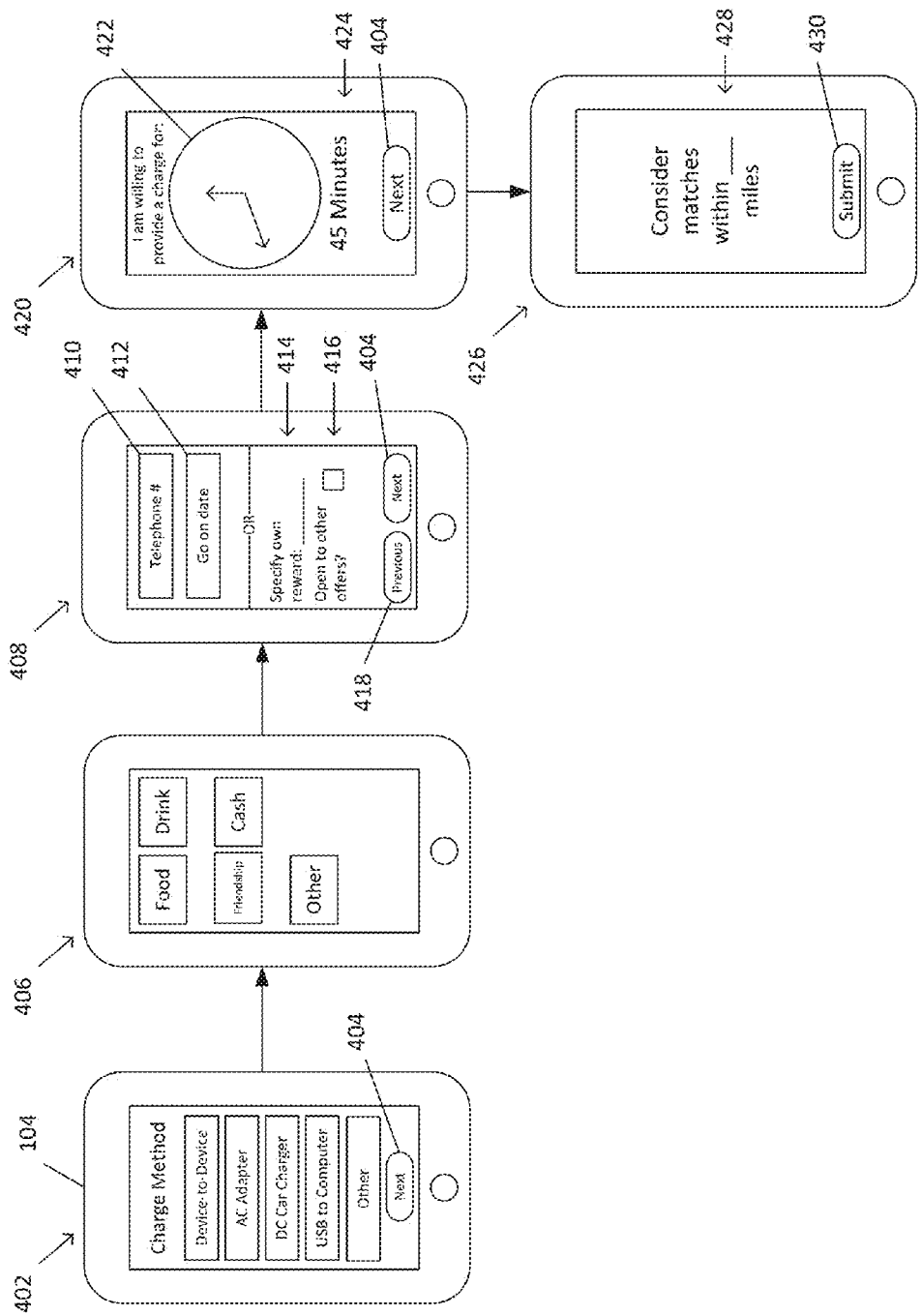
FIG. 4 shows a series of screens displayed on a mobile device of a potential charge donor for the potential charge donor to define donor preferences.

As described above, the target charge donors are identified by the matching engine according to donor preferences that are predefined by the potential charge donors. FIG. 4 shows a series of screens displayed on the mobile device 104 of a potential charge donor for the potential charge donor to define donor preferences. The potential charge donor is presented with a charge method designation screen 402. The charge method designation screen 402 includes a list of possible charge methods, including device-to-device, AC adapter, DC car charger, USB to computer, and "other". The potential charge donor selects one or more of the charge methods that he is capable of supplying by selecting a make and model of a charging device. The mobile device 104 accesses the specifications of the selected charging device to determine the power output of the selected charging device, and the output power of the selected charging device is used to determine the approximate time required for the mobile device 104 of the recipient 102 to receive a particular amount of battery charge. For example, if the potential charge donor has an AC adapter in his pocket, he would select the AC adapter charge method. If the potential charge donor has an AC adapter as well as a USB cord, and is at a location that has a computer to which the potential charge donor can connect the USB cord, he would select both the AC adapter and the USB to computer charge methods. If the potential charge donor is capable of supplying charge using a method that is not displayed, he can select "other" to be presented with additional charge methods. In this example, the potential charge donor has only an AC adapter, so he selects the AC adapter charge method. Once the potential charge donor is finished selecting one or more charge methods, he selects a "next" button 404 to proceed to the next screen.

In some implementations, the potential charge donor can select one or more charge methods by scanning a barcode and/or a serial number associated with the corresponding charging device. Based on the scanned barcode and/or serial number, the mobile device 104 can access the specifications of the selected charging device to determine the power output of the selected charging device. For example, the potential charge donor can scan a barcode of a particular AC adapter using a camera of the mobile device 104, and the mobile device 104 can retrieve specifications of the particular AC adapter. The specifications of the selected charging device can be retrieved, for example, from a network, such as the Internet, or from onboard storage of the mobile device 104.

The potential charge donor is then presented with a reward preferences screen 406. The reward preferences screen 406 includes one or more preset reward categories that the potential charge donor can choose from. The categories can include food, drink, friendship, cash, and "other". The reward preferences screen 406 allows the potential charge donor to select categories of rewards that he is willing to receive from a recipient in exchange for providing a battery charge. For example, potential charge donor may be willing to receive a cheeseburger from a recipient in exchange for providing a battery charge, in which case the recipient would select the "food" category. If the potential charge donor is willing to accept a drink from a recipient in exchange for providing a battery charge, he would select the "drink" category. If the recipient 102 is willing to accept a telephone number from a recipient or go on a date with a recipient in exchange for providing a battery charge, he would select the "friendship" category. If the potential charge donor is willing to accept a fixed sum of money from a recipient in exchange for providing a battery charge, he would select the "cash" category. If the potential charge donor is willing to accept something from a recipient that does not fall within one of the preset categories in exchange for providing a battery charge, he would select the "other" category. In this example, the potential charge donor selects the "friendship" category.

The potential charge donor is then presented with a reward specification screen 408. The reward specification screen 408 includes one or more preset rewards that fall under the selected reward category. The reward specification screen 206 for the "friendship" category can include a "telephone #" preset reward 410 and a "go on date" preset reward 412. The reward specification screen 408 can also include a manual reward field 414 where the potential charge donor can manually specify his own reward that he is willing to receive. The reward specification screen 408 can also include a checkbox 416 that the potential charge donor can select to indicate that he is open to receive other rewards from a recipient. The checkbox 416 can be checked if the potential charge donor wants to be matched with the maximum number of recipients, regardless of the reward being offered by the recipient. In this example, the potential charge donor did not check the checkbox 416, but instead selects the "telephone #" preset reward 410. The potential charge donor can select a "previous" button 418 to return to the reward preferences screen 406 and select additional rewards from other reward categories. Each reward category can have its own subsequent reward specification screen. Once the potential charge donor has completed his reward selections, he proceeds to the next screen by selecting the "next" button 404.

The potential charge donor is then presented with a time specification screen 420. The potential charge donor can specify the amount of time that he is willing to wait while providing a battery charge. The time specification screen 420 includes a visual representation of a stopwatch 422 and a corresponding time value 424. The potential charge donor specifies the amount of time that he is willing to wait by rotating the hands of the stopwatch 422. As the hands are rotated, the time value 424 is adjusted accordingly. In this example, the potential charge donor has indicated that he is willing to wait for 45 minutes while providing a battery charge. Once the amount of time that the potential charge donor is willing to wait is specified, he proceeds to the next screen by selecting the "next" button 404.

The potential charge donor is then presented with a match proximity screen 426. The match proximity screen 426 includes a distance field 428 where the potential charge donor can enter a distance. The distance is a geographic proximity that represents a maximum allowable distance between the potential charge donor and a battery-powered device of a recipient. The battery-powered device of a recipient must be within the defined distance in order for the matching engine to identify that recipient as matching the potential charge donor's donor preferences. If a recipient is located further away from the potential charge donor than the distance entered in the distance field 428, then that recipient will not be identified as matching the potential charge donor's donor preferences. The potential charge donor then selects a "submit" button 430 to submit his donor preferences.

While FIG. 4 was described with reference to a single potential charge donor, it should be understood that multiple potential charge donors each define donor preferences using the described series of screens.

While the donor preferences are defined and submitted using a mobile device 104 in this example, the donor preferences can be defined and submitted using any of a number of computing devices.

The matching engine that resides on the server 112 (shown in FIG. 1) identifies potential charge donors as target charge donors by comparing donor preferences with criteria included in requests submitted by recipients. Once the potential charge donor submits his donor preferences, they are available to the matching engine. In this example, the matching engine compares the submitted donor preferences described with reference to FIG. 4 with requests submitted by recipients. The matching engine identifies a match between the submitted donor preferences and the criteria included in the request submitted by the recipient 102 of FIGS. 1 and 2. The potential charge donor is identified as a target charge donor (e.g., target charge donor 114).

Referring briefly to FIG. 2, after the matching engine identifies a match between the donor preferences defined by the target charge donor 114 and the criteria included in the request submitted by the recipient 102, the recipient 102 is presented with a connection screen 234. To commit to the exchange, the recipient 102 selects the "connect" button 242 on the connection screen 234. Once the recipient 102 has committed to the exchange, she has a particular amount of time to connect with the target charge donor 114. In some examples, the particular amount of time is 5 minutes.

Figure 5:
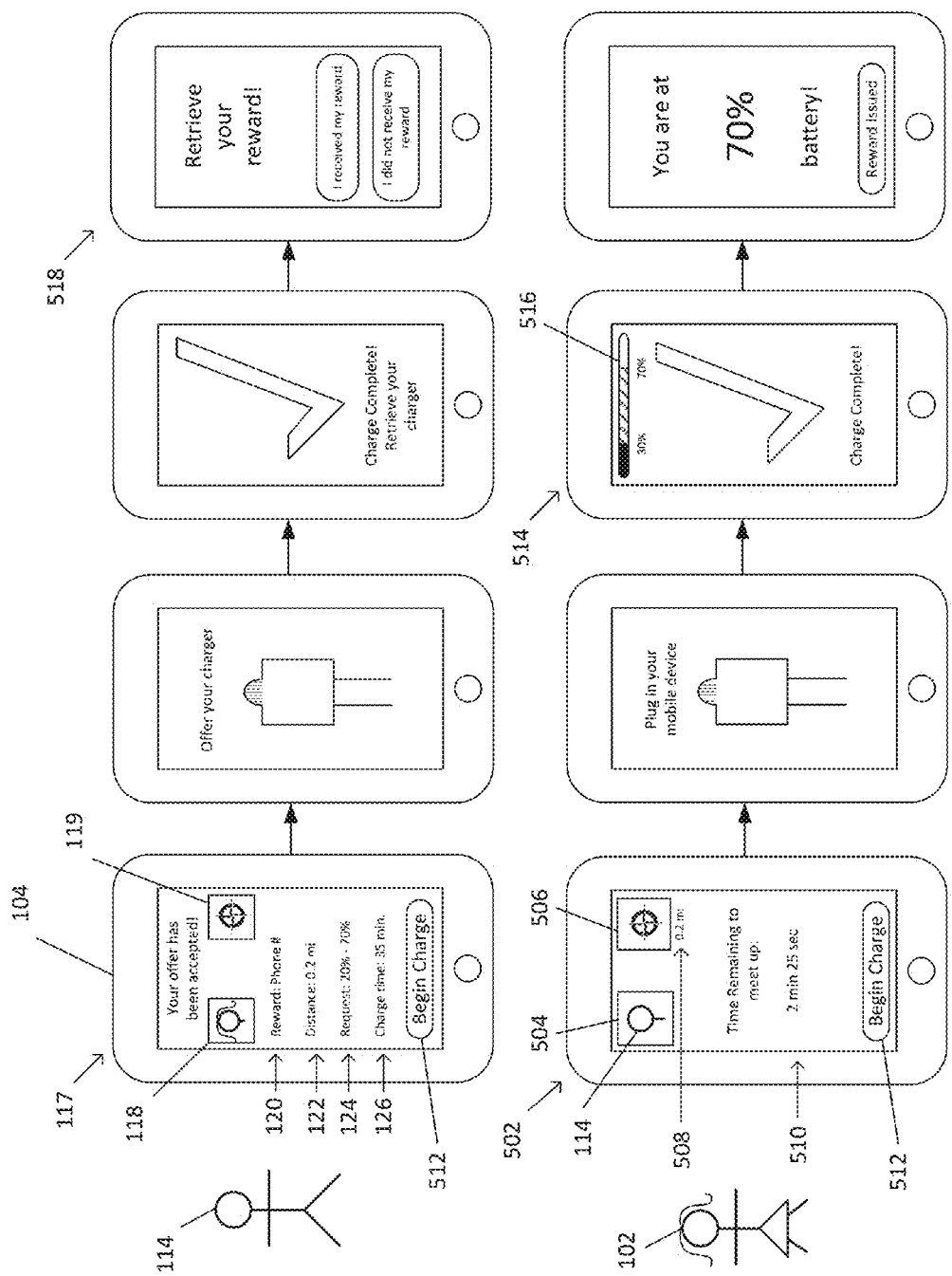
FIG. 5 shows a series of screens displayed on the mobile devices of the recipient and the target charge donor before and as charging takes place.

FIG. 5 shows a series of screens displayed on the mobile devices 104 of the recipient 102 and the target charge donor 114 before and as charging takes place. After the recipient 102 has committed to the exchange, a meet-up screen 502 is displayed on the mobile device 104 of the recipient 102. The meet-up screen 502 includes a picture of the target charge donor 504, a map icon 506, a distance indicator 508, a countdown timer 510, and a "begin charge" button 512. The countdown timer 510 displays the amount of time remaining for the recipient 102 to connect with the target charge donor. In some examples, if the recipient 102 has not connected with the target charge donor when the countdown timer 510 expires, she is charged a cancellation fee.

Once the recipient 102 has committed to the exchange, a notification 117 is displayed on the mobile device 104 of the target charge donor 114. In this example, the request from the recipient 102 has been "auto-accepted" by the target charge donor 114. The notification includes a picture of the recipient 118, a map icon 119, a reward description 120, a distance indicator 122 that indicates the geographic proximity of the recipient 102 in relation to the target charge donor 114, the requested amount of battery power 124, and the charge time to attain the requested amount of battery power 126. The reward description 120 includes a list of rewards that match both the donor preferences of the target charge donor 114 and the criteria included in the request submitted by the recipient 102. Although the recipient 102 indicated that she is open to other offers by selecting the checkbox 216 on the reward specification screen 208 (shown in FIG. 2), the target charge donor 114 selected only the "telephone #" preset reward 410 (shown in FIG. 4). As such, the only reward that the recipient 102 and the target charge donor 114 have in common is a telephone number, so that is the only reward listed. In this example, the notification also includes a "begin charge" button 512.

The target charge donor 114 and the recipient 102 can select the map icon 119, 506 to cause a map to be displayed that shows the geographic locations of the target charge donor 114 and the recipient 102 (e.g., using map software on the mobile device 104). The map aids the target charge donor 114 and the recipient 102 in meeting up.

Once the recipient 102 and the target charge donor 114 meet up, they each select the "begin charge" button 512 on their respective mobile device 104. A screen is displayed on the mobile device 104 of the target charge donor 114 that instructs him to offer his charger to the recipient 102. In this example, the target charge donor 114 indicated in his donor preferences that he could provide a charge using an AC adapter. A screen is displayed on the mobile device 104 of the recipient 102 that instructs her to plug her mobile device 104 into the provided charger. FIG. 6a shows the mobile device 104 of the recipient 102 plugged into the charger 602 and the charger 602 plugged into a wall outlet 604.

Figure 6B:
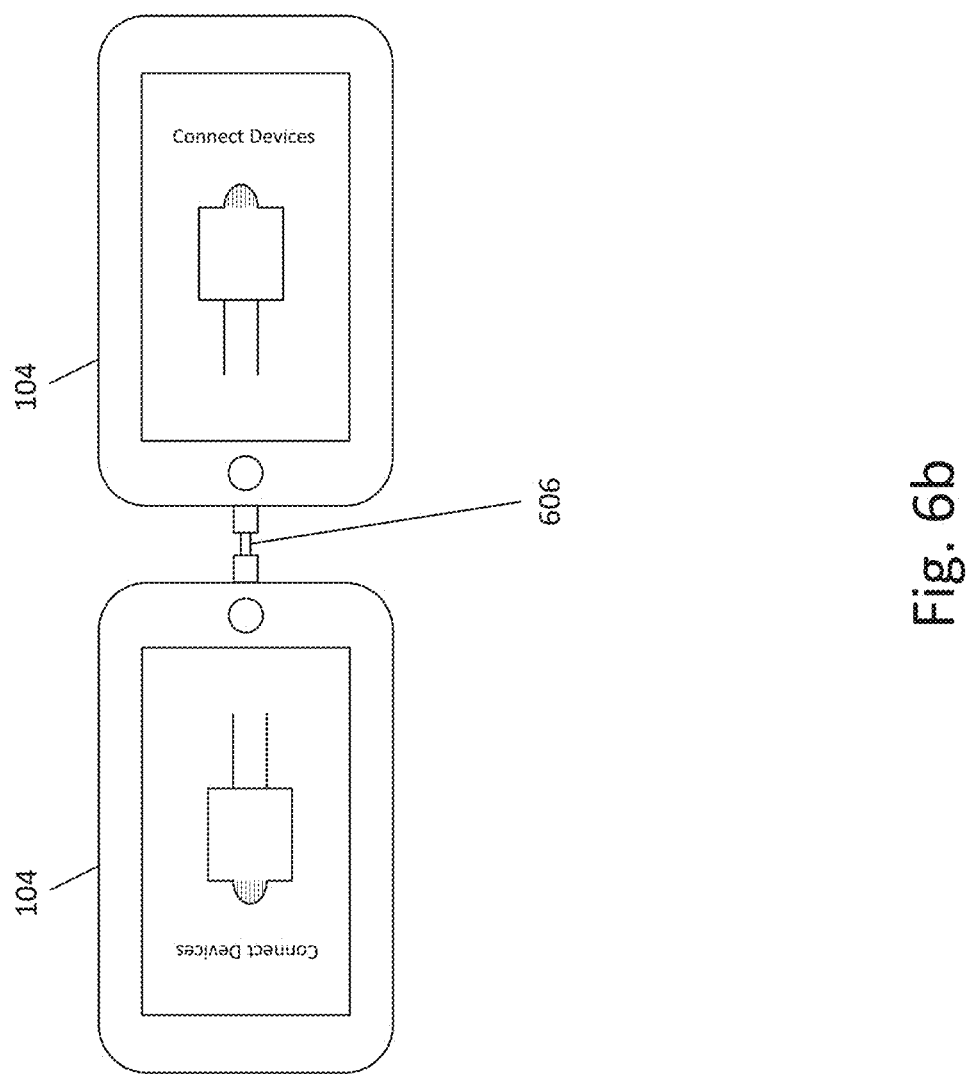
FIG. 6b shows the mobile device of the recipient connected to the mobile device of the targeted charge donor by a device-to-device link.

In some examples, the "device-to-device" charge method is indicated in the donor preferences of the target charge donor 114. In such a case, the mobile device 104 of the recipient 102 is connected to the mobile device 104 of the targeted charge donor 114, and the mobile device 104 of the target charge donor 114 provides a charge to the mobile device 104 of the recipient 102. FIG. 6b shows the mobile device 104 of the recipient 102 connected to the mobile device 104 of the targeted charge donor 114 by a device-to-device link 606. The screens that are displayed after the recipient 102 and the target charge donor select the "begin charge" button 512 on their respective mobile device 104 can have a number of appearances depending on the charge method specified in the donor preferences. For example, when using the "device-to-device" charge method, the screens can include an instruction for the recipient 102 and the target charge donor 114 to connect their mobile devices 104 to each other.

Referring again to FIG. 5, once charging has commenced, a charge progress screen 514 is displayed on the mobile device 104 of the recipient 102. The charge progress screen 514 includes a charge progress indicator 516. The charge progress indicator 516 has three regions: a filled region that indicates an amount of battery charge that the mobile device 104 had when charging commenced, a semi-filled region that indicates an amount of charge received since charging commenced, and an empty region that indicates an amount of charge that the mobile-device can still receive before it reaches its charge capacity.

Once the recipient 102 has received the requested amount of charge (e.g., a charge from 20% to about 70%), the charge progress screen 514 displays a message indicating that the charge is complete. The target charge donor 114 is also presented with a screen indicating that the charge is complete and reminding the target charge donor 114 to retrieve his charger.

Once the charge is complete, a reward retrieval screen 518 is displayed on the mobile device 104 of the target charge donor 114. The target charge donor can indicate whether or not he received the reward that was specified in the charge request submitted by the recipient 102 by selecting an "I received my reward" button or an "I did not receive my reward" button.

The recipient 102 is also presented with a screen that displays the current battery charge of her mobile device 104. The screen includes a button that the recipient 102 can select to indicate that she issued the reward to the target charge donor 114.

Figure 7:
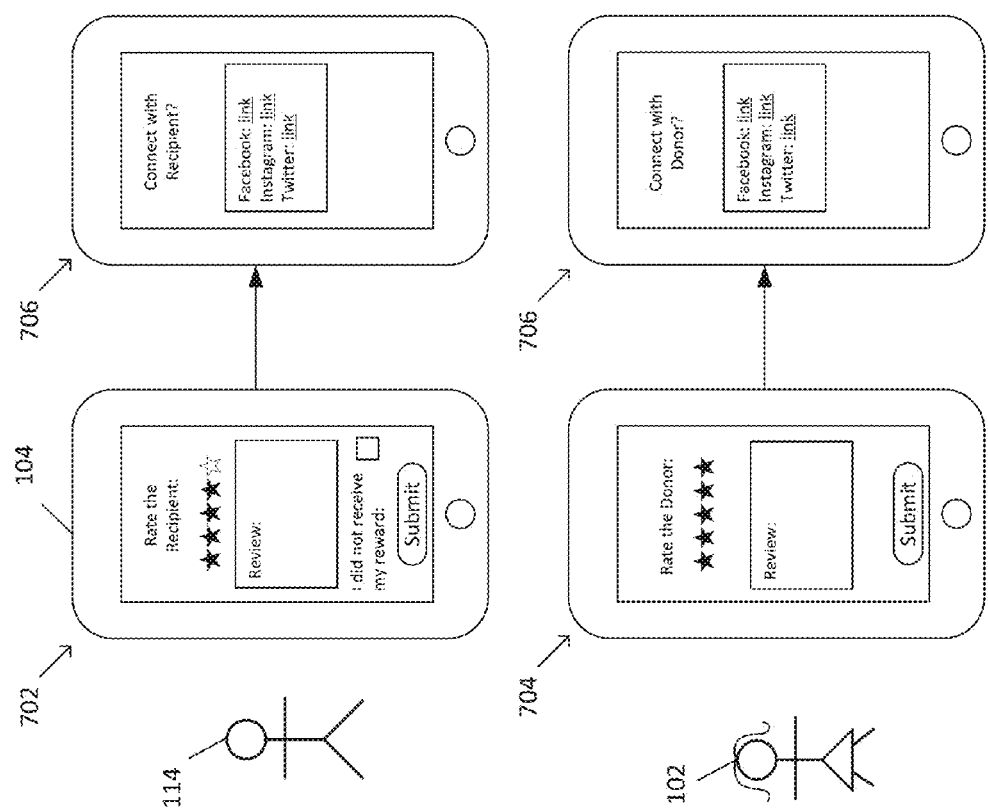
FIG. 7 shows a series of screens displayed on the mobile devices of the recipient and the target charge donor after the recipient and the target charge donor each indicates whether a reward was issued/received.

FIG. 7 shows a series of screens displayed on the mobile devices 104 of the recipient 102 and the target charge donor 114 after the recipient 102 and the target charge donor 114 each indicates whether a reward was issued/received.

The target charge donor 114 is presented with a recipient review screen 702 for reviewing the recipient 102. The recipient review screen 702 includes a rating indicator represented by five stars, a review field and/or a comment field, and a check box to indicate that a reward was not received. The target charge donor 114 rates the recipient 102 by selecting 1, 2, 3, 4, or 5 stars. A greater number of stars indicates a higher rating. The target charge donor 114 also has the option of writing a review for the recipient 102 in the review field. The target charge donor 114 checks the check box if he did not receive his reward. The target charge donor 114 submits the review by selecting a "submit" button.

The recipient 102 is presented with a donor review screen 704 for reviewing the target charge donor 114. The donor review screen 704 includes a rating indicator represented by five stars and a review field. The recipient 102 rates the target charge donor 114 by selecting 1, 2, 3, 4, or 5 stars. The recipient 102 also has the option of writing a review for the target charge donor 114 in the review field. The recipient 102 submits the review by selecting a "submit" button.

The target charge donor 114 and the recipient 102 are then each presented with a social media information screen 706 to facilitate a social media connection. The screen presented to the target charge donor 114 includes one or more links to social media profiles of the recipient 102, and the screen presented to the recipient 102 includes one or more links to social media profiled of the target charge donors. Examples of possible social media websites that may be linked include Facebook™, Instagram™, and Twitter™, to name a few.

As described above with reference to FIG. 2, the charge time indicator 240 indicates an approximate length of time required to charge the mobile device 104 of the recipient 102 from its current charge level to the requested charge level. The approximate length of time is calculated according to a charging algorithm.

The charging algorithm considers a number of factors when calculating the approximate length of time, such as the charging method to be employed, the amount of battery power on a battery-powered device of a recipient before charging begins, the amount of charge requested by the recipient, the type of battery-powered device of the recipient, and characteristics about the battery of the battery-powered device of the recipient, to name a few. If the charging method to be employed is device-to-device charging, factors related to the battery-powered device of a target charge donor are also considered, such as the amount of battery power on the battery-powered device of the target charge donor before charging begins, the type of battery-powered device of the target charge donor, and characteristics about the battery of the battery-powered device of the target charge donor, to name a few.

Information related to the factors listed above can be received from a database. In some examples, the information is received from the Internet. In some examples, the information resides directly on the battery-powered device of the user.

In one example, a battery powered device of a recipient is an iPhone™, and the charging method is an Apple™ Brand AC adapter. The recipient requests the iPhone to be charged from 30% to 50% battery power. The charging algorithm receives information from a database related to the iPhone, the battery of the iPhone, and the Apple™ AC adapter, to name a few. The charging algorithm considers the received information, the amount of battery power on the iPhone before charging begins (30%), and the amount of charge requested by the recipient (20%), and then calculates an estimated charge time of 30 minutes.

Typically, a battery that is substantially low on power requires less time to charge to a particular level than a battery that has relatively more power remaining. In another example, the same recipient with the same iPhone requests the iPhone to be charged from 10% to 30% battery power. The charging method is again an Apple™ AC adapter. The charging algorithm receives the same information from the database. This time, the amount of battery power on the iPhone before charging begins is 10%. The amount of charge requested by the recipient is still 20%. However, the charging algorithm calculates an estimated charge time of 15 minutes.

Typically, the charge method to be employed significantly impacts the estimated charge time. In another example, the same recipient with the same iPhone requests the iPhone to be charged from 30% to 50% battery power. This time, the charging method is a USB to computer charger. The charging algorithm receives information from a database related to the iPhone, the battery of the iPhone, and the particular USB to computer charger. The information related to the particular USB to computer charger indicates that the charger uses a relatively low voltage and current. The charging algorithm considers the received information, the amount of battery power on the iPhone before charging begins (30%), and the amount of charge requested by the recipient (20%), and then calculates an estimated charge time of 1 hour.

While a system for connecting users who are in need of charge on their battery-powered devices has been described in the context of mobile devices, it should be appreciated that the system is not limited to mobile devices.

Figure 8:
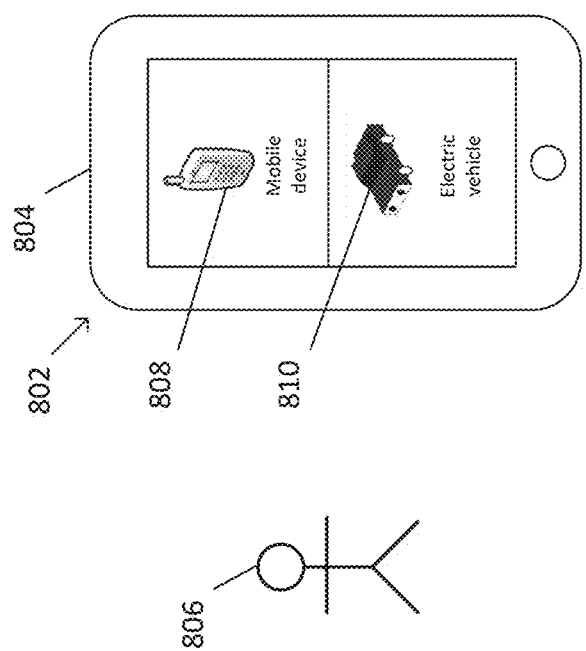
FIG. 8 shows a device selection screen displayed on a mobile device of a recipient.

In some examples, the battery-powered device is an electric vehicle. FIG. 8 shows a device selection screen 802 displayed on a mobile device 804 of a recipient 806. The device selection screen 802 can be used to select the particular device for which a battery charge is requested by the recipient 806. In some examples, the device selection screen 802 is the first screen that is displayed on the mobile device 804 of the recipient 806 when the recipient 806 begins the process of requesting a battery charge for a battery-powered device. In some examples, the device selection screen 802 is displayed in the series of screens described with reference to FIG. 2.

The device selection screen 806 includes icons that each corresponds to a particular type of battery-powered device. The device selection screen 806 can include a mobile device icon 808 and an electric car icon 810. In this example, the recipient 804 selects the electric vehicle icon 810 to request a battery charge for an electric vehicle. After selecting the electric vehicle icon 810, the recipient 806 is presented with a series of screens similar to those described with reference to FIG. 2 for the recipient 806 to define criteria related to the battery charge request. The request is then transmitted to the server 112 (shown in FIG. 1) via the network 110, and the server 112 processes the request.

As described above, the charging algorithm considers a number of factors when calculating the approximate length of time required to charge the battery-powered device from its current charge level to the requested charge level. When the battery-powered device is an electric vehicle, the charging method to be employed can be particularly important. For example, electric vehicles can be charged using a 110 volt power source or a 220 volt power source, to name a couple. These power sources can supply power at various currents. The approximate length of time required to charge an electric vehicle using a 110 volt power supply can be substantially longer than the approximate length of time required to charge the electric vehicle using a 220 volt power supply.

While the battery charge request has been described as being defined through a series of screens displayed on the mobile device 804, in some examples, the battery charge request is defined through a series of screens displayed on a display of the electric vehicle. In some examples, the request is transmitted to the server 112 by the electric vehicle.

In some examples, the electric vehicle can maintain a substantially continuous connection with the server 112 for continuously transmitting information related to the electric vehicle. The electric vehicle can include a GPS device that transmits a geographic location of the electric vehicle to the server 112. In some examples, as the electric vehicle travels, the matching engine that resides on the server 112 continuously identifies potential target charge donors based on the amount of charge on a battery of the electric vehicle, the geographic location of the electric vehicle, and the destination of the electric vehicle. The matching engine can analyze this information to determine whether the electric vehicle is capable of making it to the destination using the amount of charge on the battery without receiving a battery charge. Based on the analysis, the matching engine can provide an alert to the recipient 806 indicating that the recipient 806 should receive a charge from a charge donor or else risk running out of battery power before reaching the destination.

Figure 9:
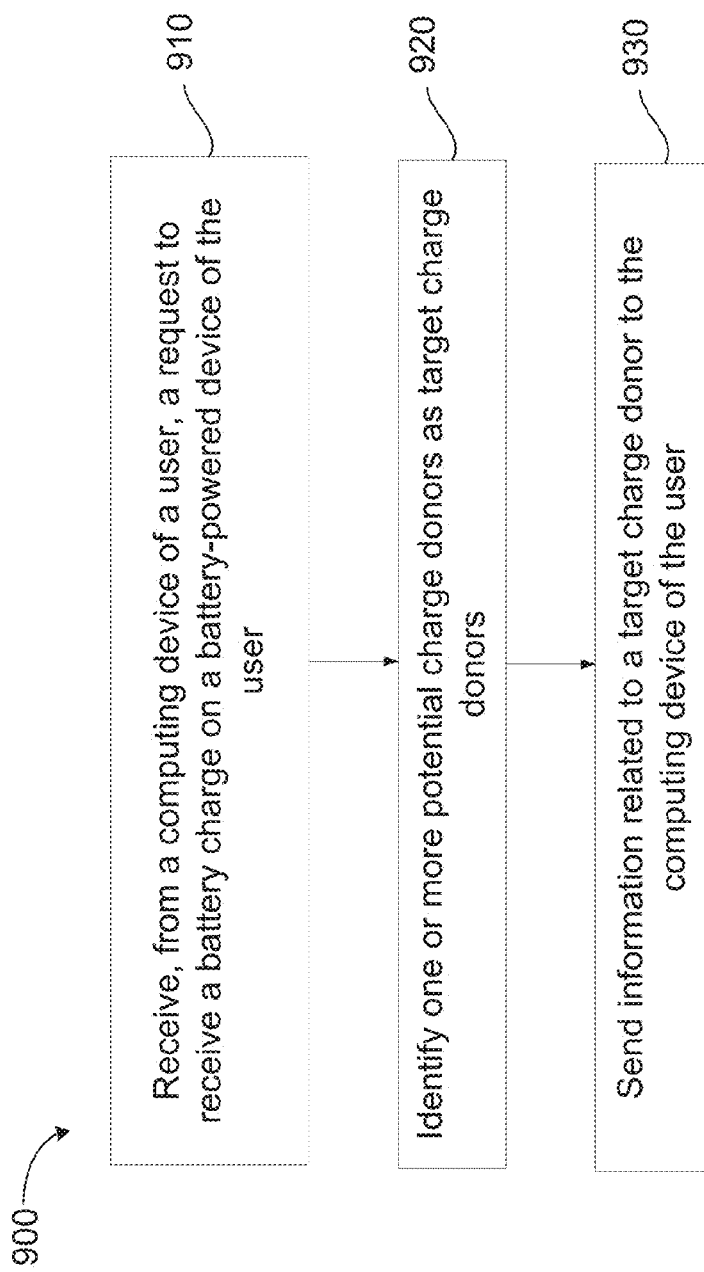
FIG. 9 is a flowchart of a process for connecting users of battery powered devices.

FIG. 9 shows an example flowchart 900 of operations for connecting users of battery powered devices. The flowchart 900 includes operations that can be performed, e.g., by one or more components of the system 100 to connect users who are in need of charge on their locally-powered devices with users who have battery power, as shown in FIG. 1. In step 910, the process receives, from a computing device of a user, a request to receive a battery charge on a battery-powered device of the user. For example, the request can be received on the server 112 from the wireless mobile device 104 of the recipient 102, as shown in FIG. 1. The request can include one or more criteria. In step 920, the process identifies one or more potential charge donors as target charge donors. For example, the one or more potential charge donors can be identified as target charge donors, e.g., target charge donor 114, by the server 112. The server 112 can identify the one or more potential charge donors as target charge donors by comparing the criteria of the request with donor preferences previously provided by potential charge donors. In step 930, the process sends information related to a target charge donor to the computing device of the user. For example, the information related to the target charge donor can be sent from the server 112.

Figure 10:
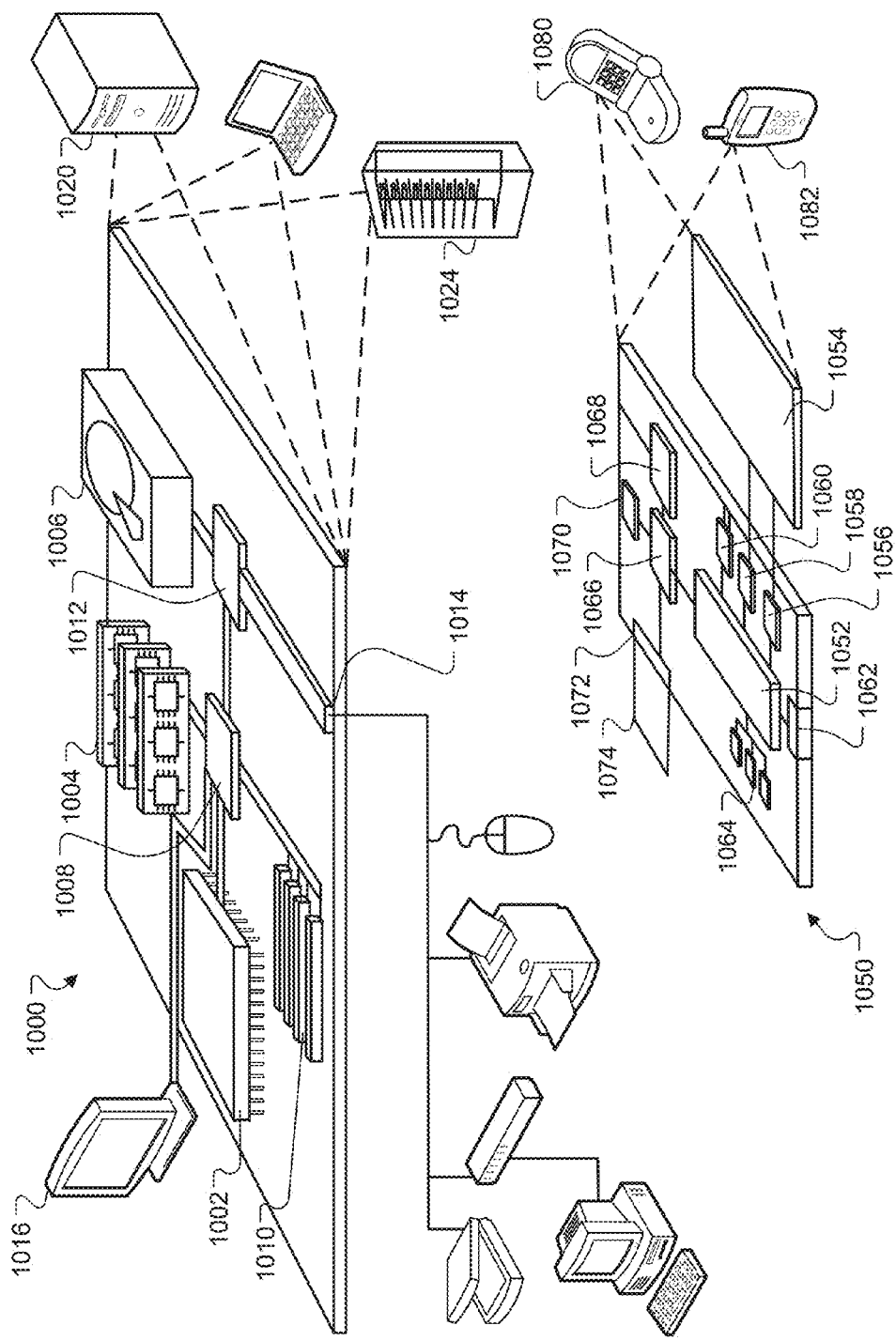
FIG. 10 is a block diagram of a computer system and associated components.

FIG. 10 shows an example of a computing device 1000 and a mobile computing device 1050 that can be used to implement the techniques described in this disclosure. For example, the computing device 1000 and/or the mobile computing device 1050 could be used to define and submit the battery charge request described with reference to FIGS. 1 and 2. The computing device 1000 and/or the mobile computing device 1050 could also be used to define and submit the donor preferences described with reference to FIG. 4. The mobile computing device 1050 could also be the wireless mobile computing device 104 shown in FIGS. 1-7. The computing device 1000 is intended to represent various forms of digital computers, such as laptops, desktops, workstations, personal digital assistants, servers, blade servers, mainframes, and other appropriate computers. The mobile computing device 1050 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 may also be another form of computer-readable medium, such as a magnetic or optical disk.

The storage device 1006 is capable of providing mass storage for the computing device 1000. In some implementations, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 1002), perform one or more methods, such as those described above. The instructions can also be stored by one or more storage devices such as computer- or machine-readable mediums (for example, the memory 1004, the storage device 1006, or memory on the processor 1002).

The high-speed interface 1008 manages bandwidth-intensive operations for the computing device 1000, while the low-speed interface 1012 manages lower bandwidth-intensive operations. Such allocation of functions is an example only. In some implementations, the high-speed interface 1008 is coupled to the memory 1004, the display 1016 (e.g., through a graphics processor or accelerator), and to the high-speed expansion ports 1010, which may accept various expansion cards (not shown). In the implementation, the low-speed interface 1012 is coupled to the storage device 1006 and the low-speed expansion port 1014. The low-speed expansion port 1014, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. In addition, it may be implemented in a personal computer such as a laptop computer 1022. It may also be implemented as part of a rack server system 1024. Alternatively, components from the computing device 1000 may be combined with other components in a mobile device (not shown), such as a mobile computing device 1050. Each of such devices may contain one or more of the computing device 1000 and the mobile computing device 1050, and an entire system may be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 may also be provided with a storage device, such as a micro-drive or other device, to provide additional storage. Each of the processor 1052, the memory 1064, the display 1054, the communication interface 1066, and the transceiver 1068, are interconnected using various buses, and several of the components may be mounted on a common motherboard or in other manners as appropriate.

The processor 1052 can execute instructions within the mobile computing device 1050, including instructions stored in the memory 1064. The processor 1052 may be implemented as a chipset of chips that include separate and multiple analog and digital processors. The processor 1052 may provide, for example, for coordination of the other components of the mobile computing device 1050, such as control of user interfaces, applications run by the mobile computing device 1050, and wireless communication by the mobile computing device 1050.

The processor 1052 may communicate with a user through a control interface 1058 and a display interface 1056 coupled to the display 1054. The display 1054 may be, for example, a TFT (Thin-Film-Transistor Liquid Crystal Display) display or an OLED (Organic Light Emitting Diode) display, or other appropriate display technology. The display interface 1056 may comprise appropriate circuitry for driving the display 1054 to present graphical and other information to a user. The control interface 1058 may receive commands from a user and convert them for submission to the processor 1052. In addition, an external interface 1062 may provide communication with the processor 1052, so as to enable near area communication of the mobile computing device 1050 with other devices. The external interface 1062 may provide, for example, for wired communication in some implementations, or for wireless communication in other implementations, and multiple interfaces may also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 may also be provided and connected to the mobile computing device 1050 through an expansion interface 1072, which may include, for example, a SIMM (Single In Line Memory Module) card interface. The expansion memory 1074 may provide extra storage space for the mobile computing device 1050, or may also store applications or other information for the mobile computing device 1050. Specifically, the expansion memory 1074 may include instructions to carry out or supplement the processes described above, and may include secure information also. Thus, for example, the expansion memory 1074 may be provide as a security module for the mobile computing device 1050, and may be programmed with instructions that permit secure use of the mobile computing device 1050. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. The instructions, when executed by one or more processing devices (for example, processor 1052), can perform one or more methods, such as those described above. The instructions can also be stored by one or more storage devices, such as one or more computer or machine-readable mediums (for example, the memory 1064, the expansion memory 1074, or memory on the processor 1052). In some implementations, the instructions can be received in a propagated signal, for example, over the transceiver 1068 or the external interface 1062.

The mobile computing device 1050 may communicate wirelessly through the communication interface 1066, which may include digital signal processing circuitry where necessary. The communication interface 1066 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 1068 using a radio-frequency. In addition, short-range communication may occur, such as using a Bluetooth, WiFi, or other such transceiver (not shown). In addition, a GPS (Global Positioning System) receiver module 1070 may provide additional navigation- and location-related wireless data to the mobile computing device 1050, which may be used as appropriate by applications running on the mobile computing device 1050.

The mobile computing device 1050 may also communicate audibly using an audio codec 1060, which may receive spoken information from a user and convert it to usable digital information. The audio codec 1060 may likewise generate audible sound for a user, such as through a speaker, e.g., in a handset of the mobile computing device 1050. Such sound may include sound from voice telephone calls, may include recorded sound (e.g., voice messages, music files, etc.) and may also include sound generated by applications operating on the mobile computing device 1050.

The mobile computing device 1050 may be implemented in a number of different forms, as shown in the figure. For example, it may be implemented as a cellular telephone 1080. It may also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable result.

What is claimed is:

1. A method comprising:
    receiving, on a server, from a computing device, a request to receive a battery charge for a battery-powered device of a user, the request comprising one or more criteria and a reward that is chosen by the user to be provided in exchange for at least the user receiving the battery charge, the one or more criteria including an amount of requested battery charge and an amount of time to receive the amount of requested battery charge, the amount of time representing a maximum amount of time that the user is willing to wait for the requested battery charge;
    storing, on the server, a plurality of sets of one or more donor preferences that are each previously provided by a corresponding potential donor, each set of one or more donor preferences including a charging method and a reward that the corresponding potential donor deems acceptable in exchange for providing a battery charge, wherein the charging method includes one or more of device-to-device charging, alternating current charging, direct current charging, and USB charging;
    identifying, by the server, one or more of the potential donors as target donors, comprising:

comparing the criteria included in the request with each of at least some of the sets of one or more donor preferences;
for each of the at least some of the sets of one or more donor preferences, determining whether the one or more donor preferences match the criteria included in the request;
comparing the reward included in the request with each of the at least some of the sets of one or more donor preferences;
for each of the at least some of the sets of one or more donor preferences, determining whether the reward that the corresponding potential donor deems acceptable in exchange for providing a battery charge matches the reward included in the request;
for each of the at least some of the sets of one or more donor preferences, determining whether the charging method is capable of providing the amount of requested battery charge within the amount of time provided in the request, including:
receiving, from a database, a voltage value and a current value to be employed by the charging method;
calculating, according to a charging algorithm that considers the voltage value and the current value to be employed by the charging method, an estimated amount of time required for the battery-powered device to receive the amount of requested battery charge via the charging method; and
comparing the amount of time provided in the request with the estimated amount of time required for the battery-powered device to receive the amount of requested battery charge; and
identifying a potential donor as a target donor if the reward that the potential donor deems acceptable matches the reward included in the request and the charging method is determined to be capable of providing the amount of requested battery charge within the amount of time provided in the request;
maintaining, by the server, a continuous connection with a GPS device of the computing device for continuously transmitting information related to the computing device, wherein the information includes a geographic location of the computing device and an amount of charge of the battery-powered device;
continuously updating potential donors that can be identified as target donors based on the amount of charge of the battery-powered device, the geographic location of the computing device, and the locations of the potential donors; and
sending, from the server, information related to a location of the target donor to the computing device, wherein the location of the target donor is represented as an icon on a map view displayed on a graphical user interface of the computing device, and includes a distance indicator that indicates the geographic proximity of the target donor in relation to the computing device, wherein the icon is selectable to view additional information related to the target donor,
wherein the reward included in the request is provided to the target donor after the battery-powered device receives the requested battery charge via the charging method.

2. The method of claim 1, wherein the computing device is the battery-powered device.

3. The method of claim 1, wherein the amount of time represents a maximum amount of time that the user is willing to wait for the requested battery charge to complete.

4. The method of claim 1, wherein the reward included in the request is provided to a third party.

5. The method of claim 4, wherein the computing device is a wireless mobile device, and the third party is a wireless service provider associated with the wireless mobile device.

6. The method of claim 4, wherein the third party is a business establishment where the user receives the battery charge for the battery-powered device.

7. The method of claim 1, wherein at least some of the sets of one or more donor preferences comprise a geographic proximity of the battery-powered device.

8. The method of claim 1, further comprising:
receiving, on the server, an indication of an amount of charge on the battery of the battery-powered device.

9. The method of claim 8, wherein the charging algorithm also considers the amount of charge on the battery of the battery-powered device.

10. The method of claim 1, further comprising:
sending, from the server, information related to the user of the battery-powered device to a computing device of the target donor.

11. The method of claim 10, wherein the computing device of the target donor is a wireless mobile device.

12. The method of claim 1, further comprising sending, from the server, information related to one or both of at least some of the donor preferences corresponding to the target donor and a link to a social media page of the target donor to the computing device.

13. The method of claim 10, wherein the information related to the user comprises a location of the user.

14. The method of claim 13, wherein the location of the user is represented as an icon on a map displayed on the computing device of the target donor.

15. The method of claim 10, wherein the information related to the user comprises one or both of at least some of the criteria of the request and a link to one or more social media pages of the user.

16. The method of claim 1, wherein the battery-powered device is a wireless mobile device.

17. The method of claim 1, wherein the battery-powered device is a vehicle.

18. The method of claim 17, further comprising:
receiving, on the server, from the computing device, one or more of information related to an amount of charge on a battery of the vehicle, information related to a geographic location of the vehicle, and information related to a destination of the vehicle.

19. The method of claim 18, wherein identifying one or more of the potential donors as target donors comprises determining, by the server, whether the vehicle is capable of reaching the destination with the amount of charge on the battery of the vehicle.

20. A system comprising:
a computing device;
a battery-powered device associated with a user; and
a server comprising:
a memory configured to store instructions; and
a processor to execute the instructions to perform operations comprising:
receiving, on a server, from a computing device, a request to receive a battery charge for a battery-powered device of a user, the request comprising one or more criteria and a reward that is chosen by the user to be provided in exchange for at least the user receiving the battery charge, the one or more criteria including an amount of requested battery charge and an amount of time to receive the amount of requested battery charge, the amount of time representing a maximum amount of time that the user is willing to wait for the requested battery charge;

storing, on the server, a plurality of sets of one or more donor preferences that are each previously provided by a corresponding potential donor, each set of one or more donor preferences including a charging method and a reward that the corresponding potential donor deems acceptable in exchange for providing a battery charge, wherein the charging method includes one or more of device-to-device charging, alternating current charging, direct current charging, and USB charging;

identifying, by the server, one or more of the potential donors as target donors, comprising:

comparing the criteria included in the request with each of at least some of the sets of one or more donor preferences;

for each of the at least some of the sets of one or more donor preferences, determining whether the one or more donor preferences match the criteria included in the request;

comparing the reward included in the request with each of the at least some of the sets of one or more donor preferences;

for each of the at least some of the sets of one or more donor preferences, determining whether the reward that the corresponding potential donor deems acceptable in exchange for providing a battery charge matches the reward included in the request;

for each of the at least some of the sets of one or more donor preferences, determining whether the charging method is capable of providing the amount of requested battery charge within the amount of time provided in the request, including:

receiving, from a database, a voltage value and a current value to be employed by the charging method;

calculating, according to a charging algorithm that considers the voltage value and the current value to be employed by the charging method, an estimated amount of time required for the battery-powered device to receive the amount of requested battery charge via the charging method; and comparing the amount of time provided in the request with the estimated amount of time required for the battery-powered device to receive the amount of requested battery charge; and identifying a potential donor as a target donor if the reward that the potential donor deems acceptable matches the reward included in the request and the charging method is determined to be capable of providing the amount of requested battery charge within the amount of time provided in the request;

maintaining, by the server, a continuous connection with a GPS device of the computing device for continuously transmitting information related to the computing device, wherein the information includes a geographic location of the computing device and an amount of charge of the battery-powered device;

continuously updating potential donors that can be identified as target donors based on the amount of charge of the battery-powered device, the geographic location of the computing device, and the locations of the potential donors; and sending, from the server, information related to a location of the target donor to the computing device, wherein the location of the target donor is represented as an icon on a map view displayed on a graphical user interface of the computing device, and includes a distance indicator that indicates the geographic proximity of the target donor in relation to the computing device, wherein the icon is selectable to view additional information related to the target donor, wherein the reward included in the request is provided to the target donor after the battery-powered device receives the requested battery charge via the charging method.

21. A non-transitory computer-readable medium comprising instructions that when executed by a processor perform a method comprising:

receiving, on a server, from a computing device, a request to receive a battery charge for a battery-powered device of a user, the request comprising one or more criteria and a reward that is chosen by the user to be provided in exchange for at least the user receiving the battery charge, the one or more criteria including an amount of requested battery charge and an amount of time to receive the amount of requested battery charge, the amount of time representing a maximum amount of time that the user is willing to wait for the requested battery charge;

storing, on the server, a plurality of sets of one or more donor preferences that are each previously provided by a corresponding potential donor, each set of one or more donor preferences including a charging method and a reward that the corresponding potential donor deems acceptable in exchange for providing a battery charge, wherein the charging method includes one or more of device-to-device charging, alternating current charging, direct current charging, and USB charging;

identifying, by the server, one or more of the potential donors as target donors, comprising:

comparing the criteria included in the request with each of at least some of the sets of one or more donor preferences;

for each of the at least some of the sets of one or more donor preferences, determining whether the one or more donor preferences match the criteria included in the request;

comparing the reward included in the request with each of the at least some of the sets of one or more donor preferences;

for each of the at least some of the sets of one or more donor preferences, determining whether the reward that the corresponding potential donor deems acceptable in exchange for providing a battery charge matches the reward included in the request;

for each of the at least some of the sets of one or more donor preferences, determining whether the charging method is capable of providing the amount of requested battery charge within the amount of time provided in the request, including:

receiving, from a database, a voltage value and a current value to be employed by the charging method;

calculating, according to a charging algorithm that considers the voltage value and the current value to be employed by the charging method, an estimated amount of time required for the battery-powered device to receive the amount of requested battery charge via the charging method; and comparing the amount of time provided in the request with the estimated amount of time required for the battery-powered device to receive the amount of requested battery charge; and identifying a potential donor as a target donor if the reward that the potential donor deems acceptable matches the reward included in the request and the charging method is determined to be capable of providing the amount of requested battery charge within the amount of time provided in the request;

maintaining, by the server, a continuous connection with a GPS device of the computing device for continuously transmitting information related to the computing device, wherein the information includes a geographic location of the computing device and an amount of charge of the battery-powered device;

continuously updating potential donors that can be identified as target donors based on the amount of charge of the battery-powered device, the geographic location of the computing device, and the locations of the potential donors; and sending, from the server, information related to a location of the target donor to the computing device, wherein the location of the target donor is represented as an icon on a map view displayed on a graphical user interface of the computing device, and includes a distance indicator that indicates the geographic proximity of the target donor in relation to the computing device, wherein the icon is selectable to view additional information related to the target donor, wherein the reward included in the request is provided to the target donor after the battery-powered device receives the requested battery charge via the charging method.

22. The method of claim 1, wherein the computing device belongs to the user.

23. The method of claim 1, wherein the reward included in the request is selected by one or more of the user, the target donor, and a third party.

24. The method of claim 23, wherein the reward is paid for or provided by the third party.

25. The method of claim 1, wherein the reward is paid for or provided by the user.

26. The method of claim 17, wherein the vehicle is an electric vehicle.

* * * * *

UNITED STATES PATENT AND TRADEMARK OFFICE
CERTIFICATE OF CORRECTION

PATENT NO. : 9,576,309 B2  
APPLICATION NO. : 14/539113  
DATED : February 21, 2017  
INVENTOR(S) : Mark Bollman, IV Page 1 of 1

It is certified that error appears in the above-identified patent and that said Letters Patent is hereby corrected as shown below:

In the Claims

Column 20, Line 60, In Claim 20, delete "on a" and insert -- on the --, therefor.

Column 20, Line 60, In Claim 20, delete "from a" and insert -- from the --, therefor.

Column 20, Line 61, In Claim 20, delete "for a" and insert -- for the --, therefor.

Column 20, Line 62, In Claim 20, delete "of a" and insert -- of the --, therefor.

Signed and Sealed this
Twenty-third Day of May, 2017

Michelle K. Lee
*Director of the United States Patent and Trademark Office*